T. HOULDING.
Spinning-Mules.

No. 145,569. Patented Dec. 16, 1873.

Witnesses:
A. Bennerkendorf
A. Sedzinek

Inventor:
T. Houlding
Per ——— Attorneys.

UNITED STATES PATENT OFFICE.

THOMAS HOULDING, OF IPSWICH, MASSACHUSETTS.

IMPROVEMENT IN SPINNING-MULES.

Specification forming part of Letters Patent No. 145,569, dated December 16, 1873; application filed May 31, 1873.

*To all whom it may concern:*

Be it known that I, THOMAS HOULDING, of Ipswich, in the county of Essex and State of Massachusetts, have invented a new and useful Improvement in Spinning Mule and Jack Carriage, of which the following is a specification:

My invention consists of a shaft extending the whole length of the carriage of a spinning mule or jack, and gearing at each end, by a toothed flanged pinion, with a kind of toothed chain, stretched from end to end of the carriage-track, to keep the carriage exactly square to the track, and prevent one end from over-running the other. The chains are adjustable in their supports at the ends, as may be needed from time to time, to adjust the carriage.

Figure 1:
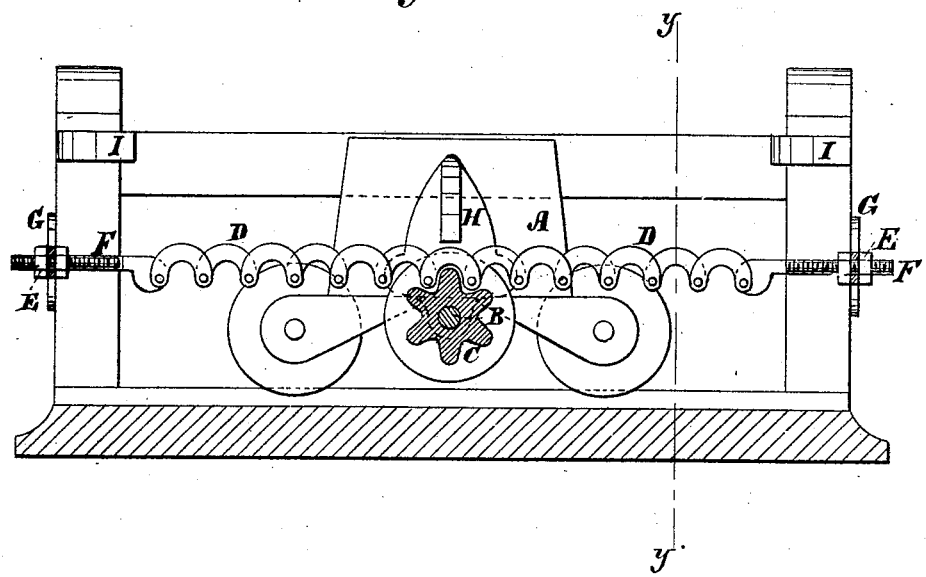
Figure 2:
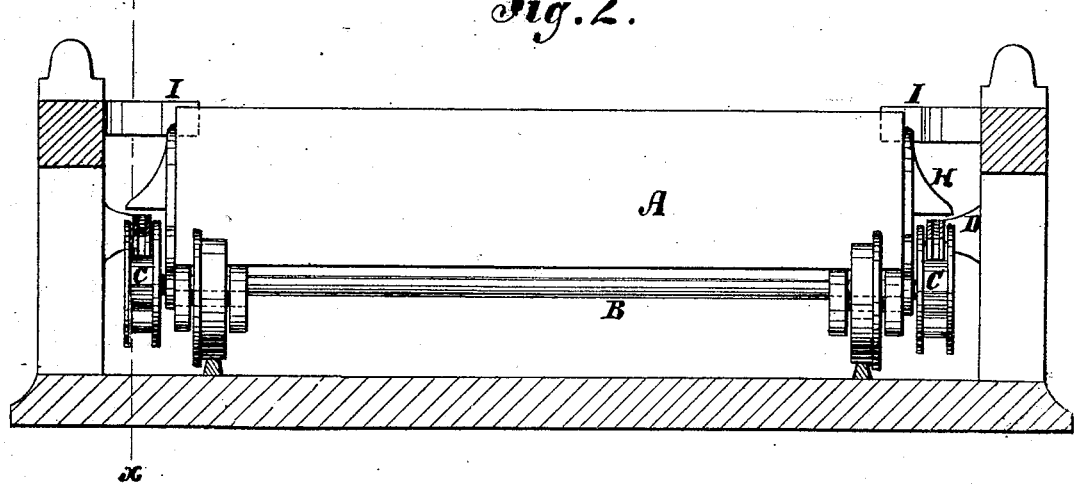

Figure 1 is a longitudinal sectional elevation of a jack-carriage with my attachment applied to it, the section being taken on the line $x$ $x$ of Fig. 2. Fig. 2 is a transverse section on the line $y$ $y$, Fig. 1.

A represents the mule or jack carriage; B, the shaft on it, extending from end to end; C, the toothed flanged pinions on the ends of the shaft; D, the toothed chain, stretched from end to end of the carriage-way between supports G, and arranged to gear with the pinions on the upper sides. F represents adjusting-screws, and E nuts, by which the chains are shifted endwise, to square the carriage to the way on which it works. H represents guards on the carriage, over the chains, to prevent them from springing up out of gear. I represents gages at each end of the path of the carriage, which may be used, if preferred, to aid in the adjustment, by indicating when the carriage is right.

By this contrivance I can quickly arrest the carriage, in case it gets out of true, or one end gets ahead or behind the other; and, when corrected, it is kept right much better and longer than it can be without the chains and pinions.

I use toothed chains D in preference to toothed bars, because they rise and fall with the pinions in case the floor or way is not exactly level.

Having thus described my invention, I claim as new and desire to secure by Letters Patent—

1. The combination of the toothed chains D, pinions C, and shaft B with a spinning mule or jack carriage, substantially as specified.

2. The said chains D arranged adjustably adjustably endwise in their supports, substantially as specified.

3. The guards H, combined with the carriage, chains, and pinions, substantially as specified.

4. The gages I, in combination with the carriage, chains, and pinions, substantially as specified.

THOMAS HOULDING.

Witnesses:
 E. H. MARTIN,
 THOMAS RIGBY.